United States Patent [19]

Millen

[11] Patent Number: 4,586,140
[45] Date of Patent: Apr. 29, 1986

[54] AIRCRAFT LIFTMETER

[75] Inventor: Ernest W. Millen, Seaford, Va.

[73] Assignee: The United States of America as represented by the Administrator of the National Aeronautics and Space Administration, Washington, D.C.

[21] Appl. No.: 578,388

[22] Filed: Feb. 8, 1984

[51] Int. Cl.$^4$ .................. G06F 15/50; G06G 7/78
[52] U.S. Cl. .................. 364/433; 364/435; 244/181; 73/178 T; 340/968
[58] Field of Search ............ 364/433, 434, 435, 427; 244/180–182; 73/178 R, 178 T, 179; 340/949, 963, 967, 968, 970, 973, 977

[56] References Cited

U.S. PATENT DOCUMENTS

| | | | |
|---|---|---|---|
| 3,486,722 | 11/1967 | Greene | 244/182 |
| 3,814,912 | 6/1974 | Manke et al. | 364/435 |
| 4,021,010 | 5/1977 | Bliss | 244/182 |
| 4,027,839 | 6/1977 | Quinlivan | 364/435 |
| 4,040,005 | 8/1977 | Melvin | 340/973 |
| 4,326,253 | 4/1982 | Cooper et al. | 364/435 |
| 4,347,572 | 8/1982 | Berwick, Jr. et al. | 364/435 |
| 4,485,446 | 11/1984 | Sassi | 364/435 |
| 4,507,657 | 3/1985 | Bates | 364/427 |

Primary Examiner—Gary Chin
Attorney, Agent, or Firm—Howard J. Osborn; John R. Manning; Robert D. Marchant

[57] ABSTRACT

A display for aiding the pilot of an aircraft in anomalous wind environments. Wind velocity components are measured by an instrument 11, processed by a computer 12 and a vector generator 17 and then displayed as a vector 34 on the display shown in FIG. 3. A signal F indicative of flap position selects a flight validated lift curve which is displayed as a lift curve channel 42. During normal wind conditions the cursor 35 marking the termination of vector 34 is in the channel of curve 42. However, during wind anomalies cursor 35 moves outside the channel. It then becomes the task of the pilot to control the aircraft such that cursor 35 will move back into the channel.

20 Claims, 4 Drawing Figures

AIRCRAFT LIFTMETER

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

The invention relates to aircraft instrumentation and more specifically concerns an aircraft display generated from wind data to enhance safe piloting techniques especially in anomalous wind environments (wind shear).

The invention utilizes the measurements of ground speed and of wind velocity in three mutually perpendicular directions. These measurements are processed to form a display useful to the pilot during wind anomalies. In the past the pilot has had a considerable amount of information displayed to him which he synthesized to make his decision as to what he should do during wind anomalies. The obvious disadvantages of this method of operation are that it takes time which the pilot might not have and it is subject to pilot error especially when he is acting in emergency situations.

It is therefore the primary object of this invention to provide a simple easy-to-use display that is useful to a pilot when his aircraft is subjected to wind anomalies.

Another object of this invention is to provide from wind measurements a display useful under wind anomaly conditions.

A further object of this invention is to provide a display of the changes in lift of an aircraft.

Still another object of this invention is to provide a capability of utilizing look-ahead anomalous wind data by providing a display predicting how the aircraft will respond to these look-ahead anomalies.

Other objects and advantages of this invention will become apparent hereinafter in the specification and drawings.

SUMMARY OF THE INVENTION

The invention utilizes on-board generated inertial wind information including the vertical inertial wind velocity. An on-board lift computer receives these inertial wind signals along with ground speed and angle-of-attack signals, and computes the change in lift, a precursor relative wind velocity, and a precursor angle-of-attack. The change in lift is displayed on a cathode ray tube (CRT). The precursor angle-of-attack and precursor relative wind velocity form a vector which is displayed dynamically on the CRT. The vector works in consort with a lift curve displayed on the CRT as a function of aerodynamic factors, airplane configuration, and environmental conditions. During normal wind conditions the cursor end of the displayed vector will lie along the displayed lift curve. During wind anomalies the vector cursor will move off the lift curve thereby informing the pilot of the effect of the wind anomalies so that he can make selected maneuvers (pitch or thrust, primarily) appropriate to move the cursor back onto the lift curve. During flight in normal winds the cursor position on the lift curve informs the pilot of airspeed and angle-of-attack safety margins over the entire flight regime for existing conditions.

The rates of change of the velocity of the wind (wind accelerations) in three mutually perpendicular directions are also determined and displayed on the CRT to give the pilot warnings of specific types of wind anaomalies being encountered.

The present invention can be used to display the effects of ambient wind anomalies at the aircraft, and, also display predicted effects of anomalies which exist ahead of the aircraft in its flight path either separately or concurrently.

DETAILED DESCRIPTION OF THE INVENTION

Figure 1:
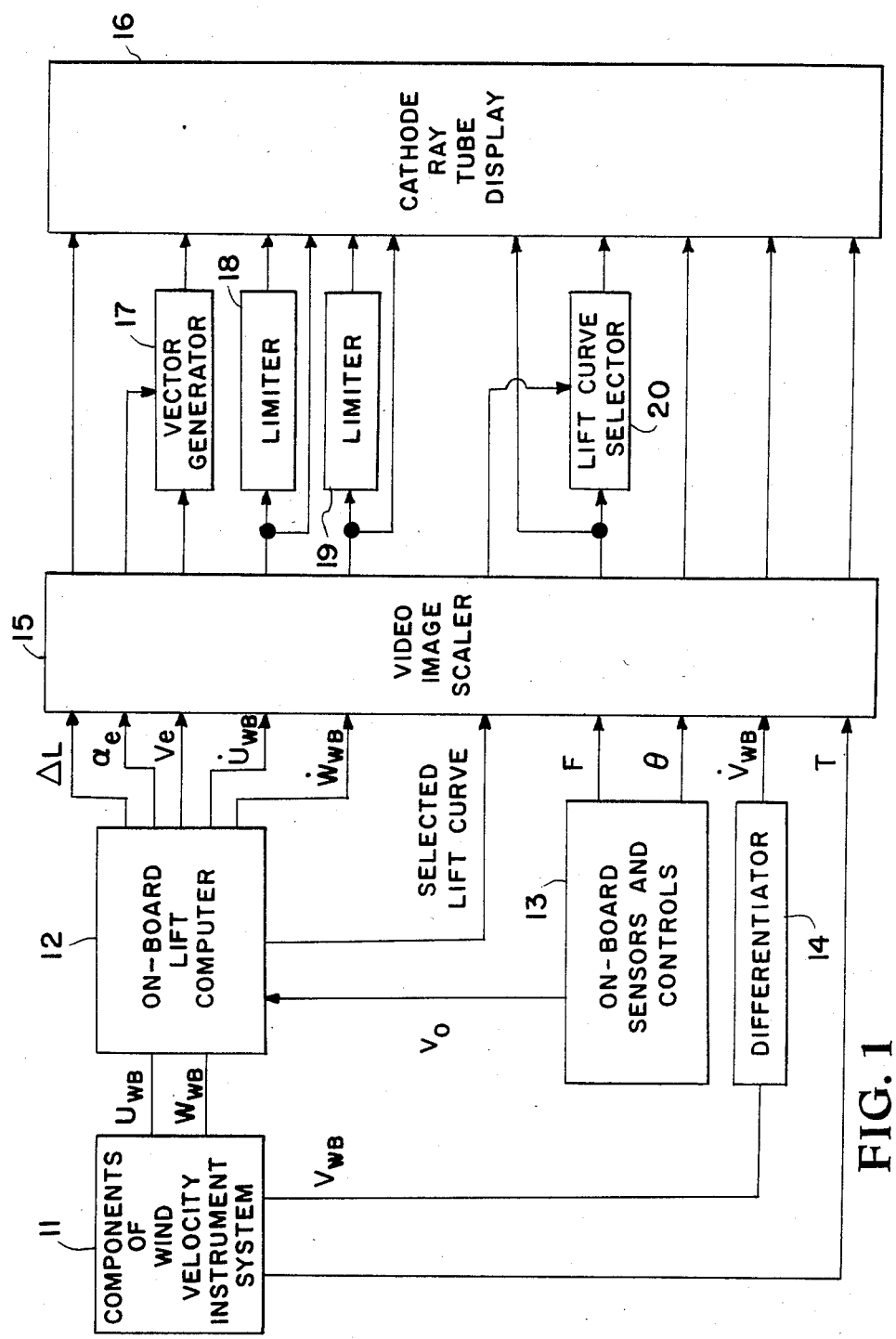
FIG. 1 is a block diagram of the invention.

Turning now to the embodiment of the invention selected for illustration in the drawings, the number 11 in FIG. 1 designates an instrument system on an aircraft for measuring the components of the inertial wind velocity. Instrument 11 produces an aircraft body axis signal, $U_{WB}$, proportional to the wind velocity in the direction that the aircraft is headed and parallel to the Earth's surface, an aircraft body axis signal, $W_{WB}$, proportional to the vertical wind velocity, and an aircraft body axis signal, $V_{WB}$, proportional to the wind perpendicular to the direction the aircraft is headed and parallel the the Earth's surface. Disclosures of instrumentation system that will perform the functions of instrument system 11 can be found in Boeing Airplane Company Document No. D6-3284, August 1977; Vaziri, Arsi and Telford, James W., Analysis of Air Motion Measurements from Aircraft, Am. Met. Soc., 1978; and Vorsman, P. and Swolinsky, M., Wind Shear Detection from PCM-Recorded MSL Flight Data, ICAS Proceedings, 12th Congress of the International Council of the Aeronautical Sciences, Munich, Federal Republic of Germany, Oct. 12-17, 1980.

Figure 4:
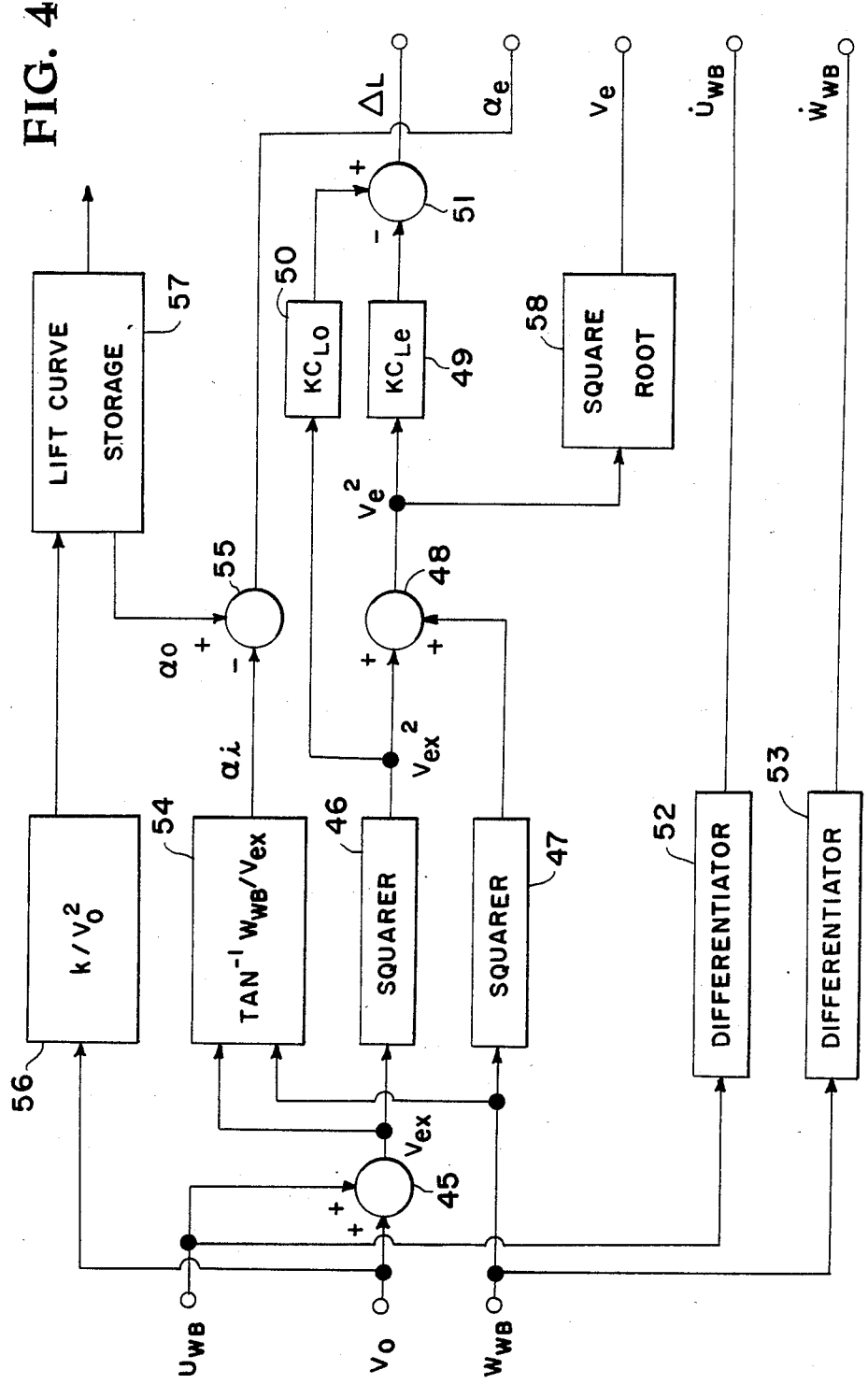
FIG. 4 is a block diagram of the on-board computer shown in FIG. 1.

The signals $U_{WB}$ and $W_{WB}$ from instrument 11 are applied to an on-board lift computer 12 which is disclosed in more detail in FIG. 4. A signal $V_o$ proportional to ground speed is measured by on-board sensors and controls 13 and applied to lift computer 12. The outputs of lift computer 12 are a signals $\Delta L$ proportional to change in lift of the aircraft, a signal $\alpha_e$ proporitonal to a precursor angle of attack, a signal $V_e$, proportional to a precursor relative wind velocity, a signal $\dot{U}_{WB}$ proportional to the differential with respect to time of $U_{WB}$, a signal $\dot{W}_{WB}$ proportional to the differential with respect to time of $W_{WB}$ and characteristic lift parameter data called "lift curves". The on-board sensors and controls 13 produce a signal F proportional to the position of the flaps on the aircraft. Signal F can be either of five values representing the up, 5°, 15°, 30° and 40° positions. The signal $V_{WB}$ is differentiated with respect to time by a differentiator 14 to produce a signal $\dot{V}_{WB}$. Signals $\Delta L$, $\alpha_e$, $V_e$, $\dot{U}_{WB}$, $\dot{W}_{WB}$, F, $\dot{V}_{WB}$ and the lift curves are applied to a video image scalers 15, to scale the signals for display on a cathode ray tube (CRT) display 16. Each of these signals require a separate video image scaler, however, for convenience these separate video image scalers are shown as one. The signals $\alpha_e$ and $V_e$ are combined by a vector generator 17 to form a vector that is displayed on the CRT 16. The signal $\dot{U}_{WB}$ is displayed digitally on CRT 16 and also has a limit 18 which applies a warning signal to the CRT only when $\dot{U}_{WB}$ exceeds some predetermined value. The signal $\dot{W}_{WB}$ is displayed on CRT 16 and it also has a limiter 19 which applies a warning signal to the CRT only when $\dot{W}_{WB}$ exceeds some predetermined value.

Figure 2:
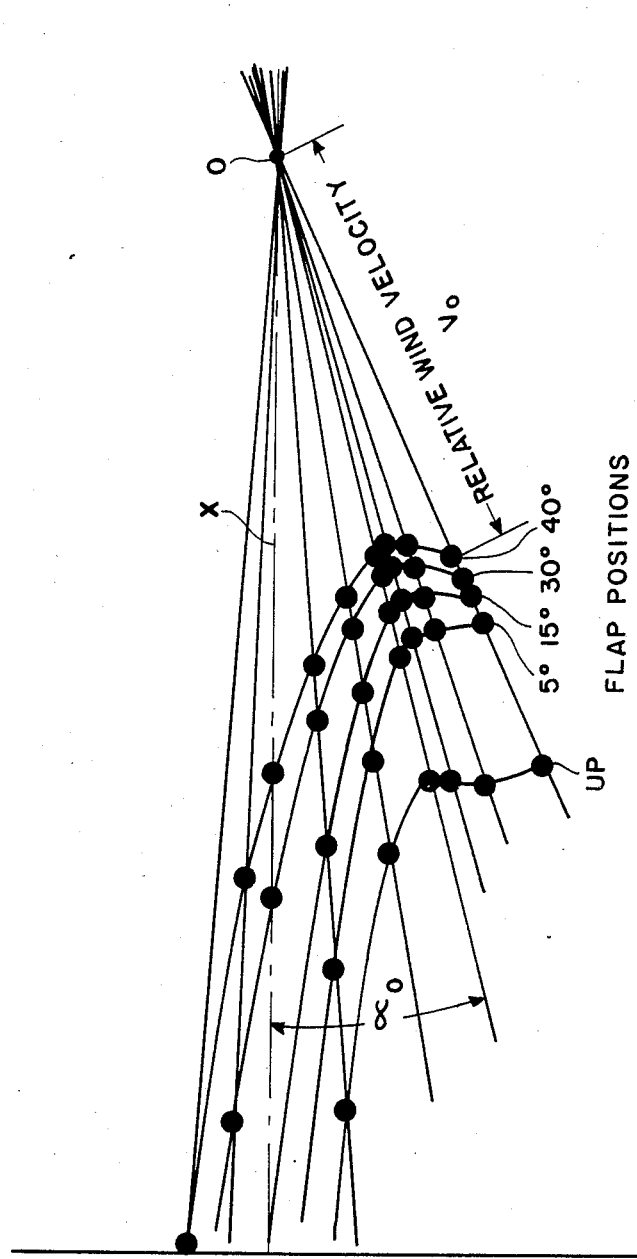
FIG. 2 shows a graph of the lift curves utilized in FIG. 1.

The signal F is displayed on the CRT and is also applied to a lift curve selector 20. Lift curve selector 20 selects one of five lift curves stored in computer 12 with each corresponding to one of the flap positions up, 5°, 15°, 30° or 40°. The lift curve selected by signal F is displayed on the CRT 16. FIG. 2 shows an example of five lift curves that can be stored in computer 12. A lift curve (expected performance curve) is the locus of relative wind and angle-of-attack points at which the lift of the aircraft is equal to the weight of the aircraft. It should be noted that as an aircraft is in flight the weight of the aircraft decreases due to the use of fuel. Also the position of the landing gears and rain influence the lift curve. Hence, to be more accurate, signals proportional to weight, rain and landing gear position could be applied to the lift curve selector to select the appropriate lift curve. In which case many more than five lift curves would be stored in computer 12. A signal $\theta$ proportional to the pitch of the aircraft from the on-board sensors and controls 13 is applied through video image scaler 15 to CRT display 16 to rotate the displayed lift curve and aircraft symbol with respect to the instrument case and displayed horizon.

The lift curves in FIG. 2 are plotted in polar coordinates with the origin 0 being at the aerodynamic center of pressure of the aircraft wing and with the axis X being an extension of the wing chordline. The lengths of the vectors that determine these curves are proportional to $V_o$ and the angles of the vectors are the angles-of-attack $\alpha_o$ during normal wind conditions. Consequently, during normal wind conditions $V_e = V_o$ and $\alpha_e = \alpha_o$, hence, the displayed vector will terminate on the displayed lift curve. However, during wind anomalies $V_e \neq V_o$ and $\alpha_e \neq \alpha_o$ thereby terminating the displayed vector at a point not on the displayed curve. These curves are initially estimated using aerodynamic design data (manufactures data based on wind tunnel and flight test experiences) then a final validated curve is drawn for the specific aircraft by flight test, before delivery, covering the flight regimes for each configuration.

Figure 3:
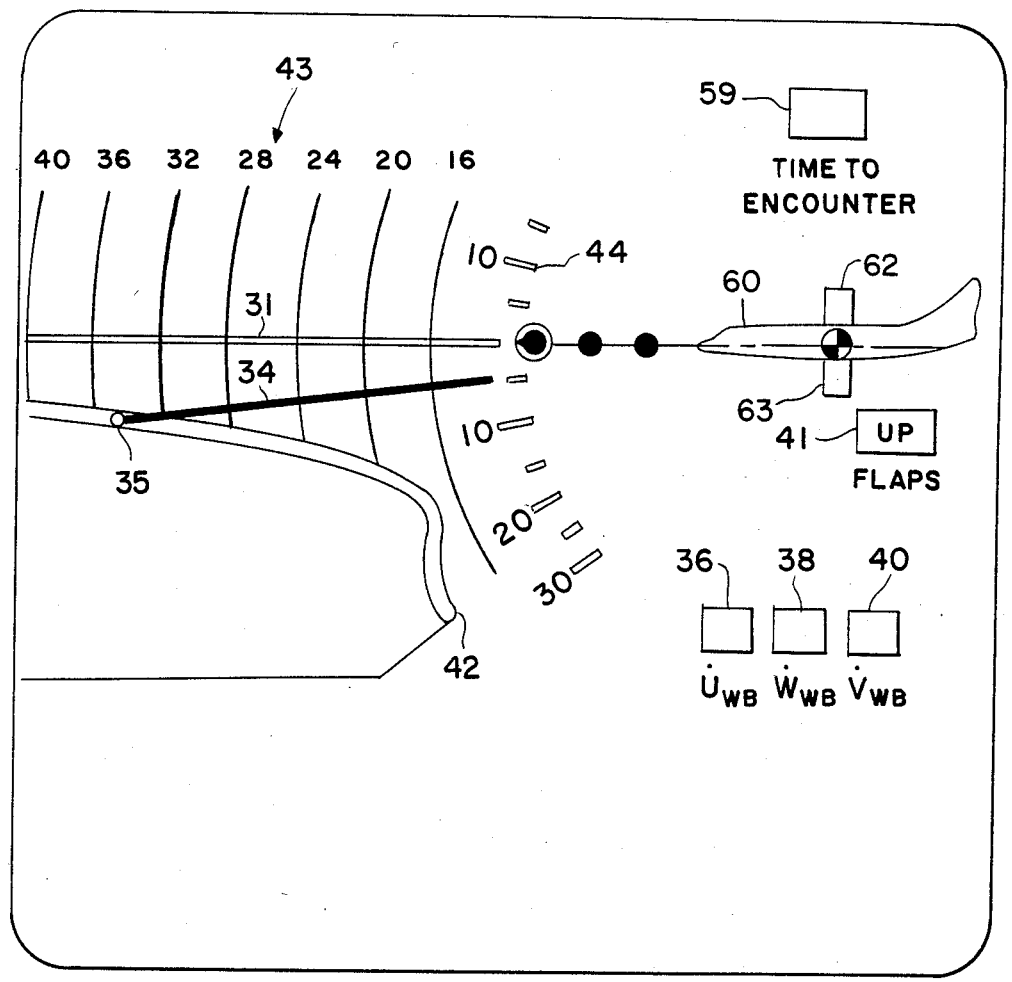
FIG. 3 is a drawing of a display that a pilot will observe during typical cruise flight.

The display for CRT 16, as shown in FIG. 3 includes an aircraft symbol 60, a flight path angle cursor, a pitch angle cursor reference horizon 31 and scale 44 for respective attack data. The circuitry for generating the aircraft 60, scale and horizon symbols is not disclosed in the application, but is well known in the prior art. The $\Delta L$ signal applied to CRT 16 is displayed in areas 62 and 63 by the height of a light bar in those areas. Area 62 is for displaying positive changes in lift and area 63 is for displaying negative changes in lift. The output of vector generator 17 is displayed as vector 34. Note that only part of the vector is displayed: it originates at the aerodynamic center of pressure of aircraft symbol 60 and terminates at a cursor 35. The value of the signal $\dot{U}_{WB}$ is digitally displayed in an area 36 and if the signal exceeds a predetermined value as sensed by limiter 18 area 36 will blink. The value of the signal $\dot{W}_{WB}$ is digitally displayed in area 38 and if the signal exceeds a predetermined value as sensed by limiter 19 area 38 will blink. Alternatively, audible sound devices could be used instead of or in addition to the blinking of areas 36 and 38. The value of the signal $\dot{V}_{WB}$ is displayed in area 40. The flap position as represented by signal F is displayed in area 41 and the lift curve 42 selected by lift curve selector 20 in response to the signal F is displayed as shown. The displayed lift curve 42 is depicted as a channel into which cursor 35 is located during normal winds. Also displayed with lift curve 42 is an air speed scale 43 which is appropriate for the flap condition selected. It is stored in computer 12 and selected with the lift curve by the signal F.

The on-board lift computer 12 in FIG. 1 utilizes the fundamental aerodynamic lift equation:

$$L = (\rho/2) C_L S V^2 \qquad (1)$$

where L is lift, $\rho$ is density of air, $C_L$ is the characteristic lift coefficient of the aircraft, a function of angle-of-attack, S is the area of the lifting surface and V is the velocity of the relative wind.

A change in lift, $\Delta L$, can be determined by comparing the lift in an existing normal wind state with the lift in what can be called a "precursor" wind state caused by rapidly changing winds:

$$\Delta L = (\rho/2) C_{L_o} S V_o^2 - (\rho/2) C_{L_e} S V_e^2 \qquad (2)$$

where the subscript "o" represents the initial conditions and the subscript "e" represents the precursor conditions.

Computer 12 computes $\Delta L$ in accordance with equation (2) as shown in FIG. 4. The signals $U_{WB}$ and $V_o$ are summed by a summing device 45 to obtain a signal $V_{ex}$. This signal is squared by a squarer 46 to obtain a signal $V_{ex}^2$. The signal $W_{WB}$ is squared by a squarer 47 and added to the signal $V_{ex}^2$ with a summing device 48 to obtain the signal $V_e^2$. The square root of the signal $V_e^2$ is obtained by a square root device 58 to produce the signal $V_e$. Note that $V_e$ is the resultant of $U_{WB}$, $V_o$, and $W_{WB2}$, and is called the relative wind velocity. The signal $V_e$ is also multiplied by $KC_{Le}$ with a multiplier 49. The signal $V_{ex}^2$ is multiplied by $KC_{Lo}$ with a multipler 50 and subtracted from $KC_{Le}V_e^2$ with a subtractor 51 to produce the $\Delta L$ signal. The signals $U_{WB}$ and $W_{WB}$ are differentiated by differentiators 52 and 53, respectively, to obtain the signals $\dot{U}_{WB}$ and $\dot{W}_{WB}$. The signals $W_{WB}$ and $V_{ex}$ are applied to a $\text{Tan}^{-1}$ device 54 to obtain a change in angle of attack $\alpha_i$ which is subtracted from $\alpha_o$ by a subtractor 55 to obtain the signal $\alpha_e$. As seen from equation (1), during initial conditions $C_{Lo}$ is equal to the weight of the aircraft. Hence, $C_{Lo} = k/V_o^2$ wherein k is a constant. Consequently, $V_o$ is applied to a computing element 56 which squares $V_o$ and then divides the square into k to obtain a signal proportional to $C_{Lo}$. This signal is applied to lift curve storage 57 which generates the lift curves. As stated above, the lift curve selector 20 with the aid of the signal F selects one of the five lift curves. For each $C_{Lo}$ of the selected lift curve there is a corresponding $\alpha_o$ in the computer "look up tables." Hence, the signal from computing element 56 selects the $\alpha_o$ from the selected lift curve and applies it to subtractor 55. Storage devices which will perform the functions of lift curve storage 57 are well known and therefore storage 57 is not disclosed in detail in this specification.

In the operation of this invention, during normal winds $V_e$ will remain constant and $\alpha_i$ will be zero thereby making $\alpha_e$ equal to $\alpha_o$. Hence, the cursor 35 will be on the lift curve 42 indicating that the lift of the aircraft is equal to the weight of the aircraft. Whenever wind anomalies occur the first indication that the pilot will receive will be blinking lights in one or both areas 36 and 38 indicating that the wind anomalies are occurring. Also there will be an indication in area 62 or 63 that the lift is changing and the direction and magnitude of the change. In addition the signal $V_e$ will change and $\alpha_i$ will no longer be zero thereby making $\alpha_e$ not equal to $\alpha_o$. Hence, the cursor 35 will move off the lift curve 42. The pilot now knows that the lift of the aircraft is not equal to the weight of the aircraft and he must maneuver the aircraft to make the two equal, that is, he must maneuver the aircraft to move cursor 35 back onto the lift curve 42. How does he do this? There are possibly many ways that this can be done but only three will be mentioned here. First, he can change the speed of the aircraft which will change $V_e$ and $\alpha_e$ for a more faborable position of the vector. Second, he can change the pitch of the aircraft which will change $\alpha_e$, and third, if he thinks he is moving into a storm he can observe areas 36, 38 and 40, to determine the characteristics of the wind and steer the aircraft in the direction to move away from the storm considering other safety and navigational factors.

This invention can also be used when the instrument 11 in FIG. 1 can look ahead of the aircraft, for example, with a doppler radar, and measure the wind components of wind anomalies in the path of the aircraft. In this mode of operation, the instrument will also produce a signal T which is the expected time to encounter with a wind anomaly. The signal T is scaled by video image scaler 15 and displayed on CRT display 16 in area 59. Whenever the pilot receives warning signals by the blinking of areas 36 and 38, and cursor 35 moves off of the lift curve 42, he will know what to expect and when. He can then maneuver the aircraft accordingly.

The advantages of this invention are that it provides a simple easy-to-use display for use by a pilot during wind anomalies, it provides a display of the change in lift of an aircraft, and it provides the capability of looking ahead of the aircraft at wind anomalies and providing a display predicting how the aircraft will respond to these anomalies. The use of this invention for controlling an aircraft during wind anomalies and the use of looking ahead of the aircraft can be used separately or in combination and concurrently. Obviously if used concurrently there would be two vectors 34 depicted on display 16. In addition to being an aid to a pilot during wind anomalies the invention is an aid to the pilot during normal winds: the cursor 35 moves in response to the normal controls of an aircraft. Also the lift curve for each flight configuration of the aircraft can be used as a flight evaluator to provide the pilot with speed and angle-of-attack limits and margins along with detailed wind conditions.

It is to be understood that the form of the invention herewith shown and described is to be taken as a preferred embodiment. Various changes can be made without departing from the invention. For example, all of the blocks in FIGS. 1 and 4 perform functions that can be performed by equipment other than that disclosed. Also, the term "signal" as used in the specification and claims is intended to cover outputs from both analog and digital type devices or combinations of the two. That is, the equipment used can be either analog or digital, or a combination of the two. The density $\rho$ as used in equation (2) is shown to be the same in both the normal and precursor wind states. However, during the precursor wind state the density can be different because of altitude, temperature or rain effects. These effects could be compensated for by detecting them and using the detections as multiplication factors in multiplier 49. In the use of the present invention display 16 will depict considerably more data than shown, such as, pitch, angle-of-attack, altitude, etc., to aid the pilot in the use of this invention.

What is claimed is:

1. A method for controlling an aircraft during wind anomalies comprising the steps of:

generating a first signal proportional to the velocity of the wind in the direction of the aircraft heading and parallel to the Earth's surface, a second signal proportional to the velocity of the vertical wind and a third signal proportional to the ground speed;

processing said first, second and third signals to produce a vector of the relative wind velocity on a display;

selecting a lift curve, the lift curve being the locus of points at which the lift is equal to the weight of the aircraft during normal winds as predetermined by flight test;

displaying said selected lift curve on said display such that the cursor endpoint of the displayed said vector is superimposed on said lift curve during normal winds;

whereby whenever the cursor endpoint of the displayed said vector is not superimposed on said displayed lift curve the pilot know that the aircraft is encountering wind anomalies and thereby can make appropriate maneuvers with the aircraft.

2. A method according to claim 1 wherein said lift curve is selected in accordance with the position of the flaps of the aircraft.

3. A method according to claim 1 including the step of differentiating said first and second signals and displaying the values of the differentiated signals on said display to give the pilot warnings when there are sudden changes in the velocity of the wind.

4. A method according to claim 1 wherein said processing said first, second and third signals to produce a vector of the relative wind velocity on a display comprises the steps of:

processing said first, second and third signals to produce a change in angle-of-attack signal;

computing the resultant of said first, second and third signals to obtain the relative wind velocity signal;

combining said change in angle-of-attack signal with an initial angle-of-attack signal to obtain a precursor angle-of-attack signal;

combining said precursor angle-of-attack signal with said relative wind velocity signal to obtain a vector of the relative wind velocity; and displaying said vector on said display.

5. A method according to claim 4 wherein said processing said first, second and third signals to produce a change in angle-of-attack signal comprises the steps of:

summing said first and third signals to obtain a summed signal; and producing said change in angle-of-attack signal by obtaining the arctangent of the second signal divided by the summed signal.

6. A method according to claim 4 wherein said step of combining said change in angle-of-attack signal with an initial angle-of-attack signal comprises subtracting said change in angle-of-attack signal from said initial angle-of-attack signal.

7. A method for controlling an aircraft whenever there are wind anomalies in the path of and a distance from the aircraft comprising the steps of:
generating a first signal proportional to the velocity of the wind in the direction of the aircraft heading and parallel to the Earth's surface at said distance from the aircraft, a second signal proportional to the velocity of the vertical wind at said distance from the aircraft and a third signal proportional to the ground speed of said aircraft:
processing said first, second and third signals to produce a vector of the relative wind velocity on a display;
selecting a lift curve, the lift curve being the locus of points at which the lift is equal to the weight of the aircraft during normal winds; and
displaying said selected lift curve on said display such that the cursor endpoint of the displayed said vector is superimposed on said lift curve during normal winds;
whereby whenever the cursor endpoint of the displayed said vector is not superimposed on said displayed lift curve the pilot knows that wind anomalies are present at said distance from the aircraft and thereby can make appropriate maneuvers with the aircraft.

8. A method according to claim 7 including the step of measuring the time for the aircraft to travel a distance from the current aircraft position to said wind anomalies and displaying said time on said display.

9. A method according to claim 7 including the steps of processing said first, second and third signals to produce the change in lift of said aircraft at said distance from the aircraft and displaying the produced change in lift on said display.

10. Apparatus for aiding a pilot to control an aircraft during wind anomalies comprising:
a display;
means for generating a first signal proportional to the velocity of the wind in the direction of the aircraft heading and parallel to the Earth's surface, a second signal proportional to the velocity of the vertical wind and a third signal proportional to ground speed;
means for processing said first, second and third signals to produce a vector of the relative wind velocity on said display; and
means for selecting a lift curve and displaying it on said display such that the cursor endpoint of the displayed said vector is superimposed on said lift curve during normal winds and deviates therefrom during wind anomalies;
whereby the display is an aid to the pilot during wind anomalies.

11. Apparatus according to claim 10 wherein said means for processing said first, second and third signals comprising means for computing a precursor angle of attack of the aircraft from said first, second and third signals, means for computing the relative wind velocity from said first, second and third signals, and means for forming said vector from said relative wind velocity and said precursor angle of attack.

12. Apparatus according to claim 10 wherein said means for selecting a lift curve includes means for selecting the lift curve in accordance with the position of the flaps of said aircraft.

13. Apparatus according to claim 10 wherein said display is a cathode ray tube display.

14. Apparatus according to claim 10 including means differentiating said first and second signals and displaying differentiated signals on said display to give the pilot warnings of anomalous wind conditions.

15. Apparatus according to claim 14 including means for generating a signal proportional to the velocity of the wind in a direction perpendicular to the direction of the heading of the aircraft and parallel to the Earth's surface, means for differentiating the last mentioned signal and means for displaying the differentiated said last mentioned signal on said display.

16. Apparatus according to claim 10 wherein said means for processing said first, second and third signals to produce a vector of the relative wind velocity on said display comprises:
means for combining said first, second and third signals to obtain both a precursor angle-of-attack signal and a relative wind velocity signal to obtain a vector of the relative wind velocity; and
means for displaying said vector on said display.

17. Apparatus according to claim 16 wherein said means for combining said first, second and third signals to obtain a precursor angle-of-attack signal comprises:
means for summing said first and third signals to obtain a summed signal;
means for obtaining the arctangent of said second signal divided by said summed signal to obtain a change in angle-of-attack signal;
means for obtaining an initial angle-of-attack signal; and
means for subtracting said change in angle of attack signal from said initial angle-of-attack signal to obtain said precursor angle-of-attack signal.

18. Apparatus for displaying the change in lift of an aircraft comprising:
a display means;
means for generating a first signal proportional to the velocity of the wind in the direction of the aircraft heading and parallel to the Earth's surface, a second signal proportional to the vertical wind and a third signal proportional to the ground speed;
means receiving said first and third signals for generating a signal proportional to the lift under initial conditions:
means receiving said first, second and third signals for generating a signal proporional to lift under precursor conditions of angle of attack and relative wind velocity;
means for subtracting the signal proportional to lift under said precursor conditions from the signal proportional to lift under initial conditions to obtain a change in lift signal; and
means for displaying said change in left signal on said display whereby said change in lift is used in controlling said aircraft.

19. Apparatus according to claim 18 wherein said means for generating a signal proporitonal to the lift under initial conditions comprises:
means for summing said first and third signals; and
means for squaring said summed signal and multiplying by a constant.

20. Apparatus according to claim 18 wherein said means for generating a signal proportional to the under precursor conditions of angle of attack and relative wind velocity comprises:
means for summing said first and third signals;
means for squaring said summed signal to obtaining a first squared signal;
means for squaring said second signal to obtain a second squared signal; and
means for summing said first and second squared signals and multiplying by a constant.

* * * * *